3,812,186
WATER-SOLUBLE, NONIONIC IODOMETHANE-
SULFONAMIDE DERIVATIVES OPAQUE TO
X-RAYS
Hans Suter, Dorflingen, and Hans Zutter and Hans Rudolf
 Muller, Schaffhausen, Switzerland, assignors to Eprova
 Aktiengesellschaft, Schaffhausen, Switzerland
No Drawing. Continuation-in-part of abandoned application Ser. No. 224,297, Feb. 7, 1972. This application July 21, 1972, Ser. No. 274,079
Claims priority, application Switzerland, Mar. 23, 1971, 4,317/71; Nov. 17, 1971, 16,746/71, 16,747/71
Int. Cl. C07c 143/74
U.S. Cl. 260—556 A                    6 Claims

ABSTRACT OF THE DISCLOSURE

Compounds of the formula

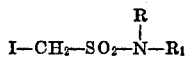

wherein R is hydrogen or methyl, and $R_1$ is β-hydroxyethyl, β - (β' - hydroxyethoxy) - ethyl, β,γ - dihydroxypropyl, or α,γ - dihydroxyisopropyl are very readily soluble in water without forming ions. Their concentrated aqueous solutions may be mixed with cerebrospinal fluid in body cavities for roentgenographic examination of the cavities, and are well tolerated.

---

This application is a continuation-in-part of the copending application Ser. No. 224,297, filed Feb. 7, 1972, and now abandoned.

This invention relates to X-ray contrast agents, and particularly to novel derivatives of iodomethanesulfonamide, their preparation, and their use in the form of aqueous compositions. More specifically, the invention is concerned with radiopaque materials which may be mixed with cerebrospinal fluid to make body cavities containing such fluid opaque to X-rays and capable of being explored by radiography.

Such body cavities were inflated heretofore with gases to displace the fluid and to reduce the opacity of the cavities to X-rays. Because of the relatively small difference in opacity between the gases and soft body tissues, the radiographs so obtained are often not capable of precise interpretation. It has also been proposed to inject into the cavities water-insoluble iodated oils and other water-insoluble, iodine-bearing organic compounds and aqueous solutions of certain iodine-bearing salts of organic acids. The water-insoluble compounds are not resorbed by the organism, cannot be removed completely by mechanical means, and cause serious side-effects in a relatively high percentage of treated patients. They are also too viscous to enter narrow passages. The known soluble salts mix with the cerebrospinal fluid and can enter even very fine openings. However, they invariably cause irritation of nerve roots.

It has now been found that derivatives of iodomethanesulfonamide having the formula

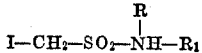

wherein R is hydrogen or methyl, and $R_1$ is β-hydroxyethyl, β - (β' - hydroxyethoxy) - ethyl, β,γ - dihydroxypropyl, or α,γ - dihydroxyisopropyl, are readily soluble in water, and that their concentrated aqueous solutions mix with cerebrospinal fluid to produce radiographs of good contrast and clear detail, yet are well tolerated, probably because they do not ionize and their solutions have relatively low osmotic pressure.

The compounds of the invention in which R is hydrogen are generally preferred, and the best combination of relevant properties is found in the compounds in which R is hydrogen and $R_1$ is dihydroxypropyl or dihydroxyisopropyl.

The compounds of the invention, in the form of their concentrated aqueous solutions have been used successfully for radiculography, myelography, myeloencephalography, and ventriculography. They are preferably employed at concentrations which produce an iodine content of at least 100 mg. per milliliter, and most favorably at higher concentrations up to their limit of solubility which permits an iodine content of 400 mg./ml. or even more to be achieved with the best compounds of the invention.

The radiopaque known compounds chemically most closely related to those of the invention and employed heretofore for similar purposes are methiodal sodium (sodium iodomethanesulfonate) and iocarmic acid [5,5'-(adipolydiimino) - bis - (2,4,6 - triiodo - N - methylisophthalamic acid)], which is normally used in the form of its N-methylglucamine salt. Other water-soluble contrast agents which may be used for angiography, urography, and in other cavities of the body are not normally employed in body cavities containing cerebrospinal fluid (see R. Schober, "Röntgenkontrastmittel and Liquorraum," pages 1–15, Spiegel, 1964, Berlin).

As compared to methiodal sodium and the salts of iocarmic acid, the compounds of the invention have the following advantages:

(1) They are very readily soluble in water although they are not salts.

(2) Their aqueous solutions do not contain ions. They are electrically non-conductive and cause little irritation of the nerve roots for this reason. Because the compounds do not dissociate, their solutions have relatively low osmotic pressure.

(3) They are physiologically well tolerated, particularly by the central nervous system. The intracerebral and intracisternal toxicity of N - α,γ - dihydroxypropyl- and N - α,γ - dihydroxyisopropyl - iodomethylsulfonamide is far lower than that of any X-ray contrast agents investigated heretofore. The improvement in intracisternal tolerance is particularly striking.

(4) Because of their good tolerance, the field of application of the contrast media of the invention may be extended beyond the lumbar region to the upper cervical sections of the subarachnoidal space and to the intracranial cavities containing cerebrospinal fluid.

It has been proposed to employ N-iodomethanesulfonyldiethanolamine or N - iodomethanesulfonyl - N-methylglucamine for similar use (German published application No. 2,031,724, Jan. 7, 1971, pages 42–44). The proposal is without practical significance because these compounds are as sparingly soluble in water as unsubstituted iodomethanesulfonamide [A. Binz et al., Biochem.

Zeitschr. 252 (1932), 16–21]. They cannot form aqueous solutions of more than 6% and 10% respectively so that the necessary iodine content of the solutions cannot be reached. When the saturated solutions are employed at the highest permissible rate (1 ml./kg.) in rabbits, the spinal cavities containing fluid cannot be made visible under X-rays. Analogous properties exclude iodomethanesulfonamide from consideration for this purpose.

To be useful for myelography and like applications, X-ray contrast compositions must contain the iodine-bearing ingredient at a minimum concentration of 20% at temperatures between ordinary room temperature and body temperature. More dilute solutions cannot produce useful contrast particularly in view of the dilution of the composition by cerebrospinal fluid within the body. No derivatives of iodomethanesulfonamide having the required solubility in water were known heretofore. The compounds of the invention form saturated aqueous solutions which contain about 45 to more than 150 grams of the compounds per 100 milliliters of solution.

The relevant properties of the Compounds A to E of the invention are listed in the following Table together with those of the structurally related Compounds F to I, and those of Compound K whose structure is remote from that of the invention, but which is in clinical use and may serve as a reference indicating acceptable tolerance. The compounds are identified in the Table by capital letters as follows:

A. N-β-hydroxyethyl-iodomethanessulfonamide
B. N-α,γ-dihydroxyisopropyl-iodomethanesulfonamide
C. N-β,γ-dihydroxypropyl-iodomethanesulfonamide
D. N-methyl-N-β,γ-dihydroxypropyl-iodomethane-sulfonamide
E. N-β-(β'-hydroxyethoxy)-ethyl-iodomethane-sulfonamide
F. Iodomethanesulfonamide
G. N-iodomethanesulfonyl-N-methyl glucamine
H. N-iodomethanesulfonyl-diethanolamine
I. Methiodal sodium
K. Iocarmic acid As is inherent in their structure, Compounds A to H do not form ions in aqueous solutions, and Compounds I and K may dissociate into 2 and 3 ions respectively so that the osmotic pressures of their solutions may be 2 and 3 times respectively the osmotic pressures of solutions of Compounds A to H under equivalent conditions.

Intravenous toxicity was determined by injecting mice with aqueous solutions containing 300 mg. iodine per kg. at a rate of 20 g. iodine per kg. per minute.

Intracerebral toxicity (48 hours) was determined in mice with a dosage of 2 ml./kg. The concentration was varied.

Intracisternal toxicity (48 hours) was determined in rabbits with solutions containing each 280 mg. iodine per kg.

The solubility in water was measured at 20° C.

The myelography tests were performed on rabbits, and the results listed are averages of findings on four rabbits each. The animals were anesthetized with pentobarbital sodium (30 mg./kg., i.v.), and 1 ml. of solution was employed per kilogram of body weight. The myelographic effect was determined on an empirical, but reproducible scale on which +++ indicates good effect, ++ clear reading, + weak contrast, − no useful effect.

All four rabbits receiving Compound I in the myelography test died, and one of the four rabbits receiving 140 mg. iodine per kg. in the test with Compound K died. All other compounds and dosage rates were well tolerated.

The superiority of Compounds A to E, particularly of Compounds B and C, over the state of the art is evident from the Table. As compared to the only useful, water-soluble Compound I, there is an important improvement

TABLE

| Cpd. | Toxicity, LD₅₀ | | | Water sol'y, g./100 ml. | Myelography | |
|---|---|---|---|---|---|---|
| | Intravenous, mg./kg. | Intracer'l, mg. I/kg. | Intracist'l, mg. I/kg. | | Dosage, mg. I/kg. | Effect |
| A | 4,150 | 214 | 58.9 | 50 | 140<br>70<br>35 | +++<br>++<br>+ |
| B | 10,900 | 385 | 89 | 153 | 280<br>140<br>70<br>35 | +++<br>+++<br>++<br>+ |
| C | 9,500 | 370 | 99 | 45 | 140<br>70<br>35 | +++<br>++<br>+ |
| D | 6,900 | 310 | | 45 | 140<br>70<br>35 | +++<br>++<br>+ |
| E | 6,100 | 262 | 96 | 50 | 140<br>70<br>35 | +++<br>++<br>+ |
| F | >1,000 | | | 0.2 | ᵃ 1 | − |
| G | | | | ~10 | ᵃ 30 | − |
| H | | | | 6 | ᵃ 27 | − |
| I | 5,550 | 58.5 | 11.8 | >100 | 140 | ++(+) |
| K | 9,300 | 280 | 37 | | 140<br>70<br>35 | +++<br>++<br>+ |

ᵃ Highest available concentration because of limited solubility.

in intracerebral tolerance, and the intracisternal toxicity of the tested compounds of the invention is far superior to the corresponding properties of Compounds I and K.

The solubility of Compounds F, G, and H is too low to make them useful for radiography of body cavities containing cerebrospinal fluid or to establish meaningful toxicity values in intracerebral or intracisternal application. The listed intravenous toxicity value of Compound F was only arrived at indirectly, and is not strictly comparable with other values for intravenous toxicity.

The compounds of the invention are readily prepared by reacting a compound of the formula $$I-CH_2-SO_2-X$$

with a compound of the formula Y—R' until X and Y jointly form the radical R—N= in the compound of the invention having the formula $$I-CH_2-SO_2-\underset{\underset{R_1}{|}}{N}-R$$

one of X and Y being halogen, that is, chlorine, bromine, or iodine, alkylsulfonyloxy, or arylsulfonyloxy, while the other one of X and Y is $$H-\underset{\underset{R}{|}}{N}-R$$

R and R₁ being as defined above, and R' being R₁ or a derivative of R₁ which has at least one masked hydroxyl group, the masking agent being removed after the principal reaction by hydrolysis or hydrogenation, as is conventional in itself. The desired iodomethanesulfonamide derivative is ultimately recovered in substantially pure, solid form.

When the method is performed by reacting an iodomethanesulfonyl halide or anhydride with an aminoalkanol or an aminoalkoxyalkanol of the formula $$H-\underset{\underset{R_1}{|}}{N}-R$$

wherein R and R₁ are as defined above, the hydroxyl groups are converted in part to the corresponding iodomethanesulfonic acid esters.

This undesired side reaction can be suppressed by employing an excess of aminoalkanol or aminoalkoxyalkanol. It can be avoided by masking the hydroxyl groups before the principal reaction, as mentioned above, by converting the hydroxyl groups to acetals, ketals, esters, or readily decomposed ethers. The alkylidene groups, oralylidene groups, such as benzylidene, diaryl methylene groups, such as benzhydrylidene groups, acyl, trityl, silyl, or trifluoromethyl groups, and functionally equivalent masking groups are removed by cautious hydrolysis or by selective hydrogenolysis.

Another method, considered less advantageous at this time, resides in reacting an iodomethanesulfonamide of the formula I—$CH_2$—$SO_2$—NH—R, wherein R is hydrogen or methyl as above, in the presence of a basic condensation agent with a halide or sulfonic acid ester of the formula Hal—R', wherein Hal is halogen or the acyl radical of a sulfonic acid, and R' is as defined above, and recovering the desired iodomethanesulfonamide derivative.

The hydroxyl group or groups may be masked in the modified procedure in the same manner as mentioned above, but such masking is not generally advantageous.

The principal reaction between compounds of the formulas I—$CH_2$—$SO_2$—NR—X and R'—Y is carried out in a basic medium. The temperature may be chosen over a very wide range from about $-20°$ C. to about $+150°$ C.

The iodomethanesulfonamide derivatives of the invention are purified and recovered in solid, substantially pure form. They are then compounded in a suitable manner to produce X-ray contrast compositions. The preferred compositions contain the compounds of the invention and water as the essential ingredients, as will be described hereinafter in more detail.

The following examples further illustrate the compounds of the invention, their preparation, and their use in the form of aqueous compositions, but it should be understood that the invention is not limited to the examples.

EXAMPLE 1

A solution of 240.1 g. iodomethanesulfonyl chloride (1.0 mol) in 600 ml. dry tetrahydrofuran was added dropwise during 2 to 3 hours to 122.2 g. $\beta$-hydroxyethylamine (2.0 mole) in 750 ml. dry tetrahydrofuran at $-10°$ to $-5°$ C. with stirring. Stirring then was continued for 2 to 3 hours, and the precipitate of $\beta$-hydroxyethylamine hydrochloride was removed by filtration with suction.

The filtrate was evaporated in a vacuum, the residue was taken up in one liter water, and the aqueous solution was extracted with diethyl ether to remove by-products. The aqueous phase was then filtered to remove turbidity, and stripped of residual amine hydrochloride by passage over a column of cation exchange resin. The eluate was neutralized with sodium hydroxide and evaporated to dryness in a vacuum. The residue was dissolved in 100 ml. ethanol and 500 ml. chloroform, and the solution was passed over a chromatographic column of silica gel. The eluate was partly evaporated to remove the solvent, and the residue was recrystallized twice from isopropanol (about 600 ml.).

122 g. N - $\beta$ - hydroxyethyl - iodomethanesulfonamide (46% yield) having a melting point of 64°—66° C. and a boiling point of 170° C. at 0.02 mm. Hg. was recovered. The compound was soluble at 20° C. in approximately twice its weight of water and in 3 weights of ethanol, but only sparingly in benzene and low-boiling petroleum hydrocarbons.

Calculated for $C_3H_8INO_3S$: C, 13.59%; I, 47.87%, S, 12.10%.
Found: C, 13.71%; I, 47.69%, S, 12.39%.

A thin layer chromatogram on silica gel (chloroform/ethanol 10/1) gave an $R_f$ value of 0.65.

EXAMPLE 2

24.4 g. sodium iodomethanesulfonate (0.1 mol) was stirred into 54 ml. concentrated hydrochloric acid. The precipitated sodium chloride was filtered off, and the filtrate was evaporated in a vacuum. The residue was mixed with 90 g. thionyl chloride in small batches, and the reaction mixture was heated for 3 to 4 hours sufficiently to keep it gently boiling. It was then evaporated to dryness in a vacuum. The residue of iodomethanesulfonic anhydride weighed 19.5 g. (94.25% yield) and was purified by dissolution and reprecipitation from dry diethyl ether. The purified anhydride melted at 47°–48° C. and was very sensitive to heat and moisture.

0.023 mol of anhydride was added to a solution of 3.05 g. $\beta$-hydroxyethylamine in 40 ml. chloroform free from alcohol. The by-products were removed by treatment with an ion exchange resin, and N-$\beta$-hydroxyethyl-iodomethanesulfonamide melting at 64°–65° C. was recovered. The compound was also formed when the chloroform was replaced by 30 ml. tetrahydrofuran.

EXAMPLE 3

42.9 g. $\beta$-($\beta'$-hydroxyethoxy)-ethylamine [2-(2-aminoethoxy)-ethanol or diglycolamine] dissolved in 300 ml. tetrahydrofuran was reacted with 49 g. iodomethanesulfonyl chloride in 60 ml. tetrahydrofuran, and the reaction product was worked up as in Example 1. The N-$\beta$-($\beta'$-hydroxyethoxy)-ethyl - iodomethanesulfonamide was crystallized from hot ethanol by adding diisopropyl ether. It weighed 26.3 g. (42% yield) and melted at 53°–55° C.

It dissolved in twice its weight of water, even more readily in lower alkanols, but was only slightly soluble in low-boiling petroleum hydrocarbons.

Calculated for $C_5H_{12}INO_4S$: C, 19.43; I, 41.06%; S, 10.37.
Found: C, 19.59%; I, 41.00%; S, 10.35%.

An $R_f$ value of 0.84 was determined by thin-layer chromatography on silica gel (chloroform/ethanol 4/1).

EXAMPLE 4

A solution of 60.12 g. iodomethanesulfonyl chloride in 80 ml. tetrahydrofuran was added drop by drop with stirring to a solution of 47.9 g. 1-aminopropanediol-2,3 in 350 ml. isopropanol at about $-10°$ C. A sludge of the amine hydrochloride precipitated, and the reaction mixture including the sludge was evaporated. The residue was taken up in water, and the aqueous liquid was extracted with ethyl ether and stripped of residual amine and amine hydrochloride by passage over a column of cation exchange resin. The eluate was neutralized with sodium hydroxide and subjected to chromatography on silica gel with ethanol/chloroform 1/5.

The N-$\beta$, $\gamma$-dihydroxypropyl-iodomethanesulfonamide so obtained was recrystallized from isopropanol/diisopropyl ether and weighed 29.5 g. (40% yield). It melted at 78°–79.5° C. and was soluble in about 2.2 times its weight of water at 20° C. much more readily soluble in methanol and ethanol, but only slightly soluble in low-boiling petroleum hydrocarbons.

Calculated for $C_4H_{10}INO_4S$: C, 16.29%; I, 43.00%; S, 10.86%.
Found: C, 16.42%; I, 42.75%; S, 10.82%.

A thin layer chromatogram on silica gel (chloroform/ethanol 4/1) gave an $R_f$ value of 0.61.

EXAMPLE 5

24.05 g. iodomethanesulfonyl chloride (0.1 mol) dissolved in 30 ml. tetrahydrofuran was added dropwise to a solution of 28.86 g. 4-aminomethyl-2,2-dimethyl - 1,3 - dioxolane (0.22 mol) in 140 ml. dry tetrahydrofuran at approximately $-10°$ C. with stirring. 4-aminomethyl-2,2-dimethyl-1,3-dioxolane hydrochloride crystallized from the mixture, was recovered by filtering, and reconverted to the free base for use in a later run. The filtrate was evaporated, the residue was taken up in chloroform, and the chloroform solution was washed with water, dried, and evaporated to dryness.

4-iodomethanesulfonylaminomethyl-2,2-dimethyl - 1,3-dioxolane was obtained in several runs as a viscous oil in an amount of 27.5 g. to 33 g. (82%–98% yield). It dissolved readily in lower alkanols, ketones, esters, chloroform, benzene, and ethyl ether, but was only poorly soluble in water, diisopropyl ether, and low-boiling petroleum hydrocarbons. A thin layer chromatogram on silica gel with chloroform gave an $R_f$ value of 0.45.

25.8 g. 4-iodomethanesulfonylaminomethyl-2,2-dimethyl-1,3-dioxolane was dissolved at slightly elevated temperature in about 27 ml. 0.1 N hydrochloric acid. The solution was cooled, neutralized with 0.1 N sodium hydroxide solution, and evaporated to dryness in a vacuum. The residue of N - $\beta,\gamma$ - dihydroxypropyl-iodomethanesulfonamide was recrystallized from a little isopropanol. 17 g.–19 g. was recovered in several runs (75%–84% yield). The compound melted at 80°–82° C.

Calculated for $C_4H_{10}INO_4S$: C, 16.29%; I, 43.01%; S, 10.86%
Found: C, 16.26%; I, 42.86%; S, 10.68%.

The 4-aminomethyl-2,2-dimethyl - 1,3 - dioxolane employed as a starting material was prepared as follows:

100 g. 4-phthalimidomethyl-2,3-dimethyl-1,3-dioxolane. (E. S. Sakellarios, Helv. Chimica Acta 29, 1675–1682, 1946) was dissolved in 1150 ml. ethanol, 26.5 g. 80% hydrazine hydrate was added, and the mixture was stirred at boiling temperature for six hours. A precipitate formed and was filtered off. The filtrate was evaporated, and the residue was combined with the precipitate previously filtered off. The combined materials were mixed with 480 ml. 2 N sodium hydroxide solution, and the mixture was heated at 50°–60° C. for about 45 minutes. Phthalyl hydrazide was precipitated and removed by filtering. The filtrate was extracted with chloroform, and the extract was carefully concentrated using a column. The residue was fractionated by distillation. The desired product was obtained as a fraction boiling at 89° C. at 40 mm. Hg in an amount of 35.2 g. (70% yield).

Calculated for $C_6H_{13}NO_2$: C, 54.93%; N, 10.68%
Found: C, 54.81%; N, 10.61%

EXAMPLE 6

44 g. iodomethanesulfonamide (0.2 mol) was dissolved in 200 ml. 1 N sodium hydroxide solution, mixed with 22.1 g. 1-chloro-2,3-propanediol (0.2 mol), and the mixture was stirred for about three hours at 60°–70° C. Stirring was then continued until the mixture cooled to room temperature. A precipitate formed and was removed by filtering. It melted at 180°–185° C. and consisted of unreacted iodomethanesulfonamide (4.5 g.). The filtrate was evaporated, most of the residue was dissolved in 750 ml. chloroform and 250 ml. ethanol, and sodium chloride was filtered off. The filtrate was subjected to chromatography on a column of silica gel under chloroform/ethanol 3/1. The eluate showed only a single spot in a thin-layer chromatogram. It was recovered and evaporated. The residue was recrystallized from isopropanol and diisopropyl ether. It consisted of 28.6 g. N-$\beta,\gamma$-dihydroxypropyl-iodomethanesulfonamide (48.5% yield), melted at 79°–81° C. and gave an $R_f$ value of 0.61 in a thin-layer chromatogram with chloroform/ethanol 4/1.

EXAMPLE 7

23.5 g. 1-methylaminopropanediol-2,3 in 150 ml. tetrahydrofuran was reacted with 25.3 g. iodomethanesulfonyl chloride dissolved in 30 ml. tetrahydrofuran. A sludge essentially consisting of the hydrochloride of 1 - methyl-aminopropanediol-2,3 precipitated. The entire reaction mixture was evaporated in a vacuum, and the residue was dissolved in 300 ml. water. The solution was extracted with ethyl ether, and the aqueous phase was stripped of the amine and its hydrochloride by passage over a column of a cation exchange resin. The eluate was neutralized with 1.0 N sodium hydroxide, evaporated, and purified as in Example 1 over a chromatographic column of silica gel.

The N-methyl-N-$\beta,\gamma$-dihydroxypropyl-iodomethanesulfonamide so obtained was recrystallized from chloroform and weighed 13.2 g. (41% yield). It melted at 75°–76° C., dissolved in 2.2 times its weight of water at 20° C., very readily in methanol and acetone, but only sparingly in ethyl ether.

Calculated for $C_5H_{12}INO_4S$: C, 19.43%; I, 41.06%; S, 10.37%
Found: C, 19.60%; I, 41.17%; S, 10.54%

Thin-layer chromatography on silica gel using chloroform/ethanol 10:1 yielded an $R_f$ value of 0.43.

EXAMPLE 8

304 g. (2.32 mole) 5-amino-2,2-dimethyl - 1,3 - dioxan was dissolved in 150 ml. tetrahydrofuran, and a solution of 269 g. (1.12 mole) iodomethanesulfonyl chloride in the same solvent was added with stirring while the temperature was held at −15° to −5° C. The temperature then was permitted to rise to 0° C., and stirring was continued for two hours. The hydrochloride of 5-amino-2,2-dimethyl-1,3-dioxan precipitated and was recovered by suction filtrate in an amount of 191 g., melting at 142° C.

The filtrate was evaporated to dryness, and the residue was recrystallized from 1300 ml. isopropanol. 330 g. 5-iodomethanesulfonylamino-2,2-dimethyl-1,3 - dioxan was obtained (88% yield) and melted at 137°–140° C. It was identified by elementary analysis:

Calculated for $C_7H_{14}INO_4S$: C, 25.08%; I, 37.86%; S, 9.57%
Found: C, 25.55%; I, 36.41%; S, 9.64%

The compound readily dissolves in methanol, acetone, ethyl acetate, and chloroform, is only sparingly soluble in isopropanol, and even less soluble in water and low boiling paraffins. It gave an $R_f$ value of 0.18 in thin layer chromatography on silica gel with chloroform.

990.4 g. (2.96 mole) 5 - iodomethanesulfonylamino-2,2-dimethyl-1,3-dioxan prepared as described in the preceding paragraph was suspended in 1700 ml. 0.1 N hydrochloric acid, and the suspension was briefly heated to 45° C. whereby a yellowish red solution was formed. It was cooled to room temperature and adjusted to pH 6 with 170 ml. 1-N sodium hydroxide solution. The mixture so obtained was filtered and evaporated in a rotary evaporator at a bath temperature of 50° C. A crystalline material weighing 903.7 g. gradually formed, and was dissolved in 4000 ml. hot ethyl acetate. The precipitating sodium chloride was removed by filtration, the filtrate was evaporated to dryness, and the residue was recrystallized from isopropanol.

N - $\alpha,\gamma$ - dihydroxyisopropyl - iodomethanesulfonamide was thereby obtained in an amount of 777.3 g. (89% yield) and melted at 72.5°–73.5° C. It was identified by elementary analysis:

Calculated for $C_4H_{10}INO_4S$: C, 16.29%; I, 43.01%; S, 10.86%
Found: C, 16.31%; I, 43.07%; S, 11.89%

A solution of the compound saturated at 20° C. contains 85 g. thereof per 100 g. of the solution whose specific gravity is 1.8.

When iodomethanesulfonyl chloride is reacted with a commercial grade of 2-amino-1,3-propanediol in the manner illustrated in Example 4, there is obtained a product melting at 87°–89° C. and soluble in water only in an amount of 66 g. per 100 ml. Its toxicity is the same as that of N-$\alpha,\gamma$-dihydroxyisopropyl-iodomethanesulfonamide, but it contains appreciable amounts of less soluble isomers, such as N-$\beta,\gamma$-dihydroxypropyl-iodomethanesulfonamide because of the presence of 1-amino-2,3-propanediol and other isomers in the starting material.

The 5-amino-2,2-dimethyl-1,3-dioxan employed as a starting material is prepared by catalytic hydrogenation of 5-nitro-2,2-dimethyl-1,3-dioxan in ethanol in the presence of sodium acetate, glacial acetic acid, and palladium on carbon. It boils at 70°–76° C. at 12 mm. Hg, melts at 39°–40.5° C., and was found to have an equivalent weight of 133.7 as compared to the calculated value of 131.2 for pure 5-amino-2,2-dimethyl-1,3-dioxan [G. B. Linden et al., J. Org. Chem. *21* (1956), 1175].

The iodomethanesulfonamide derivatives of the invention are preferably employed for radiography in the form of their aqueous solutions which may contain more than one such derivative. Depending on the specific application, the solutions may contain 20% to 65% of the radiopaque compounds or even more, corresponding to an iodine content of about 100 to approximately 400 mg./ml. Concentrated solutions are preferred.

The solutions are applied by instillation after lumbar or suboccipital puncture for myelography and radiculography. The ventricles are punctured directly for ventriculography. The approximate doses are 5 to 15 ml. for myelography, 3 to 5 ml. for radiculography, and 1 to 2 ml. for ventriculography.

The solutions of the compounds synthesized as described in Examples 1 to 9 are prepared in a simple manner by dissolving the desired amount of solid material in bidistilled water under sterile conditions, filtering the solution, and transferring it to multi-puncture vials or to glass vials which are sealed by fusion.

The following examples illustrate the preparation of the aqueous compositions.

EXAMPLE 9

93.1 g. N-α,γ-dihydroxyisopropyl-iodomethanesulfonamide was dissolved in a minimal amount of water at 37° C. under a nitrogen blanket. The solution was adjusted to pH 7 by adding 0.24 g. sodium bicarbonate and filtered through a filter having an average pore diameter of 0.22 mµ. The filtrate was diluted with bidistilled water to precisely 100 ml. and was transferred to multi-puncture vials having capacities of 10 and 20 ml. The solution contained 400 mg. iodine per ml.

In an analogous manner, solutions containing 280 mg. iodine per ml. were prepared in batches of 100 ml. from 65 g. N-β,γ-dihydroxypropyl-iodomethanesulfonamide and 66 g. N-β,γ-dihydroxypropyl-iodomethanesulfonamide, each requiring about 0.2 g. sodium bicarbonate for pH adjustment.

EXAMPLE 10

100 ml. radiopaque aqueous solution was prepared from 58.5 g. N-β-hydroxyethyl-iodomethanesulfonamide, 0.01 g. disodium edetate, and 0.435 g. disodium phosphate for pH adjustment. It contained 280 mg. iodine per ml. The solution was lyophilized, and the lyophilizate was stored over an extended period and reconstituted by dissoluttion in water immediately prior to use.

What is claimed is:

1. A compound which is an iodomethanesulfonamide derivative having the formula

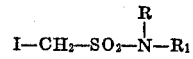

$$I-CH_2-SO_2-\overset{R}{\underset{|}{N}}-R_1$$

wherein R is hydrogen or methyl, and $R_1$ is β-hydroxyethyl, β-(β'-hydroxyethoxy)-ethyl, β,γ-dihydroxypropyl, or α,γ-dihydroxyisopropyl.

2. A compound as set forth in claim 1, wherein R is hydrogen.

3. A compound as set forth in claim 2, wherein $R_1$ is β-hydroxyethyl, the compound having the formula

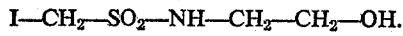

$$I-CH_2-SO_2-NH-CH_2-CH_2-OH.$$

4. A compound as set forth in claim 2, wherein $R_1$ is β-(β'-hydroxyethoxy)-ethyl, the compound having the formula

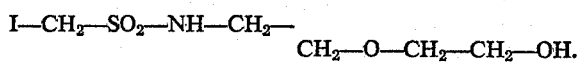

$$I-CH_2-SO_2-NH-CH_2-CH_2-O-CH_2-CH_2-OH.$$

5. A compound as set forth in claim 2, wherein $R_1$ is β,γ-dihydroxypropyl, the compound having the formula

$$I-CH_2-SO_2-NH-CH_2-CHOH-CH_2OH.$$

6. A compound as set forth in claim 2, wherein $R_1$ is α,γ-dihydroxyisopropyl, the compound having the formula

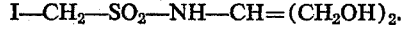

$$I-CH_2-SO_2-NH-CH=(CH_2OH)_2.$$

References Cited

UNITED STATES PATENTS 3,701,771  10/1972  Almen et al. _ _ _ _ _ _ 260—556 A

OTHER REFERENCES

CA 74: 99662e (1971) Almen et al.

HENRY R. JILES, Primary Examiner

S. D. WINTERS, Assistant Examiner

U.S. Cl. X.R.

260—543 R, 545 R, 340.9, 326 A, 340.7; 424—5